3,334,145
DIARYL HYDROXYALKYL PHOSPHONIUM COMPOUNDS
Daniel W. Grisley, Jr., Kirkwood, Mo., assignor to Monsanto Research Corporation, St. Louis, Mo., a corporation of Delaware
No Drawing. Filed Sept. 29, 1964, Ser. No. 400,191
7 Claims. (Cl. 260—606.5)

This invention relates to new chemical compounds, and more particularly, to new hydroxyalkyl phosphonium compounds.

The novel compounds provided in accordance with this invention are diaryl hydroxyalkyl phosphonium compounds containing two phosphorus atoms, of the formula

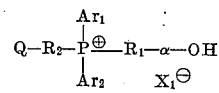

in which Q is a phosphorus-containing radical selected from the class consisting of

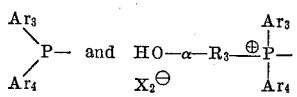

and each Ar (each of $Ar_1$, $Ar_2$, $Ar_3$ and $Ar_4$) is a hydrocarbon radical of from 6 to 12 carbon atoms, containing aromatic unsaturation and free of aliphatic unsaturation, each R (each of $R_1$, $R_2$ and $R_3$) is a saturated aliphatic hydrocarbon radical of from 1 to 6 carbon atoms and each X (each of $X_1$ and $X_2$) is a halide ion.

Thus, the compounds of the invention are selected from alkylene bis[diaryl(α-hydroxyalkyl)phosphonium] halides and diaryl(diarylphosphinoalkyl)(α-hydroxyalkyl) phosphonium halides.

Exemplary of the presently provided novel alkylene bis[diaryl(α-hydroxyalkyl)phosphonium] halides are, for example:

methylenebis[diphenyl(hydroxymethyl)phosphonium chloride],
methylenebis[diphenyl(hydroxymethyl)phosphonium bromide],
ethylidenebis[diphenyl(hydroxymethyl)phosphonium bromide],
ethylidenebis[diphenyl(hydroxymethyl)phosphonium chloride],
isopropylidenebis[diphenyl(hydroxymethyl)phosphonium iodide],
isopropylidenebis[diphenyl(hydroxymethyl)phosphonium chloride],
butylidenebis[ditolyl(hydroxymethyl)phosphonium bromide],
n-hexylidenebis[diphenyl(hydroxymethyl)phosphonium chloride],
hexamethylenebis[diphenyl(hydroxymethyl)phosphonium chloride],
methylenebis[dinaphthyl(hydroxymethyl)phosphonium chloride],
methylenebis[diphenyl(1-hydroxyethyl)phosphonium chloride],
methylenebis[di-2,4-xylyl(1-hydroxyethyl)phosphonium bromide],
ethylenebis[di-o-tolyl(1-hydroxyethyl)phosphonium fluoride],
ethylidenebis[di-p-tolyl(1-hydroxyethyl)phosphonium iodide],
butylidenebis[diphenyl(1-hydroxyethyl)phosphonium chloride],
tetramethylenebis[dibiphenylyl(1-hydroxypropyl)phosphonium chloride],
methylenebis[diphenyl(1-hydroxypropyl)phosphonium chloride],
ethylidenebis[dibiphenylyl(1-hydroxybutyl)phosphonium chloride],
pentylidenebis[di-alpha-naphthyl(1-hydroxycyclohexyl)phosphonium chloride],
hexamethylenebis[bis(p-ethylphenyl)(2-ethyl-1-hydroxybutyl)phosphonium chloride], and the like.

Illustrative of the presently provided diaryl(diarylphosphinoalkyl)(α-hydroxyalkyl)phosphonium halides are, for example, diphenyl(diphenylphosphinomethyl)(hydroxymethyl) phosphonium chloride,
diphenyl(1-diphenylphosphinoethyl)(hydroxymethyl) phosphonium bromide,
diphenyl(2-diphenylphosphinoethyl)(hydroxymethyl) phosphonium iodide,
diphenyl(3-diphenylphosphinopropyl)(hydroxymethyl) phosphonium chloride,
diphenyl(1-diphenylphosphinobutyl)(hydroxymethyl) phosphonium chloride,
dibiphenylyl(dibiphenylylphosphinomethyl)(hydroxymethyl)phosphonium bromide,
dicyclohexyl(dicyclohexylphosphinomethyl)(hydroxymethyl)phosphonium chloride,
di-p-tolyl(di-p-tolylphosphinomethyl)(hydroxymethyl) phosphonium chloride,
di-beta-naphthyl(di-beta-naphthylphosphinomethyl)(hydroxymethyl)phosphonium chloride,
diphenyl(4-diphenylphosphinobutyl)(hydroxymethyl) phosphonium bromide,
diphenyl(diphenylphosphinomethyl)(1-hydroxyethyl) phosphonium chloride,
diphenyl(diphenylphosphinomethyl)(1-hydroxybutyl) phosphonium bromide,
diphenyl(diphenylphosphinomethyl)(1-hydroxy-2-methylbutyl)phosphonium chloride,
diphenyl(6-diphenylphosphinohexyl)(1-hydroxybutyl) phosphonium bromide, and the like.

The presently provided phosphorus compounds are prepared by reacting an alkylene bis(diarylphosphine) with an aldehyde in the presence of a hydrogen halide. In conducting the preparation of these compounds, useful alkylene bis(diaryl phosphines) include, for example, methylenebis(diphenylphosphine),
ethylenebis(diphenylphosphine),
methylenebis(dibiphenylylphosphine),
methylenebis(di-alphanaphthylphosphine),
methylenebis(di-p-tolylphosphine),
methylenebis(di-2,4-xylylphosphine),
methylenebis[bis(p-butylphenyl)phosphine],
methylenebis[bis(dipropylphenyl)phosphine],
ethylenebis(di-p-tolylphosphine),
tetramethylenebis(diphenylphosphine),
butylidenebis(diphenylphosphine),
hexamethylenebis(diphenylphosphine),
methylenebis(diisopropylphenylphosphine), and the like.

Exemplary of the presently useful aldehydes are, for example, acyclic aldehydes such as formaldehyde, acetaldehyde, propionaldehyde, butyraldehyde, valeraldehyde, 2-ethylbutyraldehyde, and the like, and aldehydes containing a ring such as cyclopentylcarboxaldehyde, cyclohexylcarboxaldehyde, and cyclohexaneacetaldehyde.

In carrying out the reaction of the aldehyde with the alkylene bis(diarylphosphine) to provide diaryl(diarylphosphinoalkyl)(α - hydroxyalkyl)phosphonium halides and alkylene bis[diaryl(α-hydroxyalkyl)phosphonium] halides, the reactants are simply contacted in the presence of a hydrogen halide. It may be advantageous to employ a solvent or diluent in the reaction mixture. Suitable inert organic solvents and diluents in this connection include hydrocarbons such benzene or hexane, oxygenated solvents free of active hydrogen such as diethyl ether, diglyme (dimethyl ether of ethylene glycol), and the like. To accelerate the rate of reaction if desired, heating may be employed. Temperatures used may vary from down to where the reaction mixture is barely liquid to up to any temperature below the decomposition temperatures of the reaction mixture components. The rapidity of the reaction will vary with the reactants chosen, and in some cases the reaction may be exothermic and require cooling and/or diluents to moderate its violence, while other pairs of reactants may not react completely until after refluxing at elevated temperatures. In general, suitable temperatures for carrying out the reaction comprise temperatures in the range of from 0° to 50° C., and more particularly, ambient temperatures such as 20–30° C. Pressure variation may also be utilized to facilitate conducting the reaction, for example by carrying out the reaction in a pressure-resistant vessel under autogenous pressure and elevated temperatures. The pressures may vary from superatmospheric pressures up to say 5000 p.s.i., down to subatmospheric pressures as low as say 0.05 mm. Hg, although usually normal atmospheric pressures are suitable.

The stoichiometric ratios of the reactants vary depending on whether the diphosphonium salt or the phosphinoalkyl phosphonium salt is the desired product. Generally, both are formed simultaneously in the reaction, with relatively low ratios of aldehyde to alkylene bis(diarylphosphine) such as a molar ratio of below about 2:1. Indeed, higher ratios may be employed, up to say about a 5:1 ratio of aldehyde to alkylene bis(diarylphosphine) if desired, and where the formation of the alkylene bis(phosphonium salt) is the object of the reaction, even higher ratios, such as ratios ranging up to a 10:1 ratio of aldehyde to alkylene bis(diarylphosphine) may be used if desired. Lower ratios of aldehyde to alkylene bis(diarylphosphine) are also useful, such as ratios of 1:1, and below. Thus, the alkylene bis(diarylphosphine) may be present in excess if desired, ranging up to a 10:1 molar ratio to the aldehyde.

The reaction is conducted in the presence of a hydrogen halide (HF, HCl, HBr, and HI). Preferably the acid is introduced gradually, to maintain the reaction mixture at an acid pH (below 7) without reaching strong acid pH values (below 1). The amount introduced should be about (±10–20%) sufficient to provide an atom of halogen for each phosphine group quaternized by reaction with the aldehyde; this amount will vary, depending on the phosphine/aldehyde ratio and the desired product.

The time required to accomplish the reaction depends on functional factors such as the reactivity of the reactants, the temperature of reaction, and the like. Reaction rates and times of reaction may vary considerably also depending on the details of apparatus and other operational conditions. By suitable arrangements, continuous procedures may be substituted for the batch type operation described below. On completion of the reaction, the products may be recovered by conventional methods such as precipitation, vaporization, distillation, extraction and the like.

The presently provided products are stable, generally solid materials which are useful for a variety of agricultural and industrial purposes. Thus, they may be employed as chelating (sequestering) agents, as flameproofing agents for textiles and wood, and so forth. They may also be used as agricultural toxicants, to suppress the growth of bacteria or fungi, as herbicides, particularly as contact herbicides, as defoliants, and as insecticides, for the control of mosquitoes, for example.

The invention is illustrated but not limited by the following examples.

*Example 1*

This example illustrates the preparation of diphenyl-(diphenylphosphinomethyl) (hydroxymethyl)phosphonium chloride.

Gaseous HCl is passed through a mixture of 19.2 grams (g.) (0.05 mole) of methylenebis(diphenylphosphine) and 1.5 g. (0.05 mole) of paraformaldehyde, in 500 milliliters (ml.) of diethyl ether and 200 ml. of benzene. The reaction mixture is cooled to maintain the temperature of the mixture at between 20 and 30° C. during the initial exotherm. Introduction of the HCl is continued until a powdery white solid appears in the reaction mixture. The reaction mixture is then filtered and the filtrate is evaporated at 50° C./20 mm., to provide an oily solid which is rinsed with several portions of benzene. The benzene is azeotroped after which the residue solidifies. The residue is washed with ether and then recrystallized from hot t-butanol and dried at 25° C./0.1 mm. The product, which melts at 153.5–155.5° C. (with decomposition), is diphenyl(diphenylphosphinomethyl)(hydroxymethyl)phosphonium chloride. The identification is confirmed by elemental analysis:

Calcd. for $C_{26}H_{25}ClOP_2$: C, 69.25; H, 5.89; Cl, 7.86; O, 3.55; P, 13.74%. Found: C, 69.14; H, 6.14; Cl, 7.71; O, 3.66; P, 13.75%.

The white solid filtered off from the reaction mixture mentioned above is methylenebis[diphenyl(hydroxymethyl)phosphonium chloride], which may be recovered as described in the next example.

*Example 2*

This example describes the preparation of methylenebis[diphenyl(hydroxymethyl)phosphonium chloride].

Gaseous hydrogen chloride is passed through a mixture of 19.2 g. (0.05 mole) of methylenebis(diphenylphosphine) and 1.57 g. (0.05 mole) of 95% (aqueous) paraformaldehyde in 100 ml. of ether. The reaction mixture remains at slow reflux during the addition of the hydrogen chloride gas, over a period of six hours. The hydrogen chloride input is then discontinued, and dry nitrogen is bubbled through the reaction mixture overnight. The following morning a white fluffy solid has formed in the reaction mixture. The solid is filtered off and mixed with benzene, which is decanted from the resulting oil. The oil is extracted with 200 ml. of methylene dichloride. The white powder which separates in this extraction is washed with ether and triturated with acetone and then ether. The resulting solid product is dried at 0.1 mm., to provide methylenebis[diphenyl(hydroxymethyl)-phosphonium chloride], m. 166–169° C. The identification is corroborated by elemental analysis:

Calcd. for $C_{28}H_{28}Cl_2O_2P_2$: C, 63.52; H, 5.33; Cl, 13.39; O, 6.04; P, 11.65%. Found: C, 62.86; H, 5.86; Cl, 13.20; O, 6.33; P, 11.72%.

Diphenyl(diphenylphosphinomethyl) (hydroxymethyl)-phosphonium chloride can be recovered from the filtrate separated from the reaction mixture, following the procedure described in the preceding example.

Substituting acetaldehyde for the paraformaldehyde employed above, the products are methylenebis[diphenyl-(1-hydroxyethyl)phosphonium chloride] and diphenyl-(diphenylphosphinomethyl) (1-hydroxyethyl)phosphonium chloride.

While the invention has been described with particular reference to specific preferred embodiments thereof, it will be appreciated that modifications and variations can be made without departing from the scope of the invention as disclosed herein, which is limited only as indicated in the following claims.

What is claimed is:
1. A diaryl hydroxyalkyl phosphonium compound containing two phosphorus atoms, of the formula

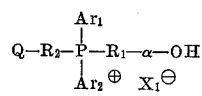

in which Q is a phosphorus-containing radical selected from the class consisting of

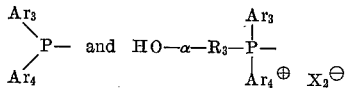

and each Ar is a hydrocarbon radical of from 6 to 12 carbon atoms containing aromatic unsaturation and free of aliphatic unsaturation, each R is a saturated aliphatic hydrocarbon radical of from 1 to 6 carbon atoms, and each X is a halogen ion.

2. A diaryl diarylphosphinoalkyl hydroxyalkyl phosphonium salt of the formula

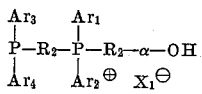

in which each Ar is a hydrocarbon radical of from 6 to 12 carbon atoms containing aromatic unsaturation and free of aliphatic unsaturation, each R is a saturated aliphatic hydrocarbon radical of from 1 to 6 carbon atoms, and $X_1^-$ is a halogen ion.

3. The compounds of claim 2 in which $R_1$-α-OH is hydroxymethyl.

4. Diphenyl(diphenylphosphinomethyl)(hydroxymethyl)phosphonium chloride.

5. Alkylenebis[diaryl(hydroxyalkyl)phosphonium] salts of the formula

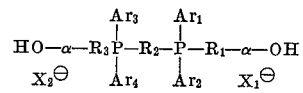

in which each Ar is a hydrocarbon radical of from 6 to 12 carbon atoms containing aromatic unsaturation and free of aliphatic unsaturation, each R is a saturated aliphatic hydrocarbon radical of from 1 to 6 carbon atoms, and each $X^\ominus$ is a halogen ion.

6. The compounds of claim 5 in which $R_1$-α-OH and $R_3$-α-OH each represent hydroxymethyl radicals.

7. Methylenebis[diphenyl(hydroxymethyl)phosphonium chloride].

References Cited

Jaffe: Chemical Abstracts (1960), vol. 54, page 22362.

TOBIAS E. LEVOW, *Primary Examiner.*

W. F. W. BELLAMY, *Assistant Examiner.*